United States Patent Office 3,185,742
Patented May 25, 1965

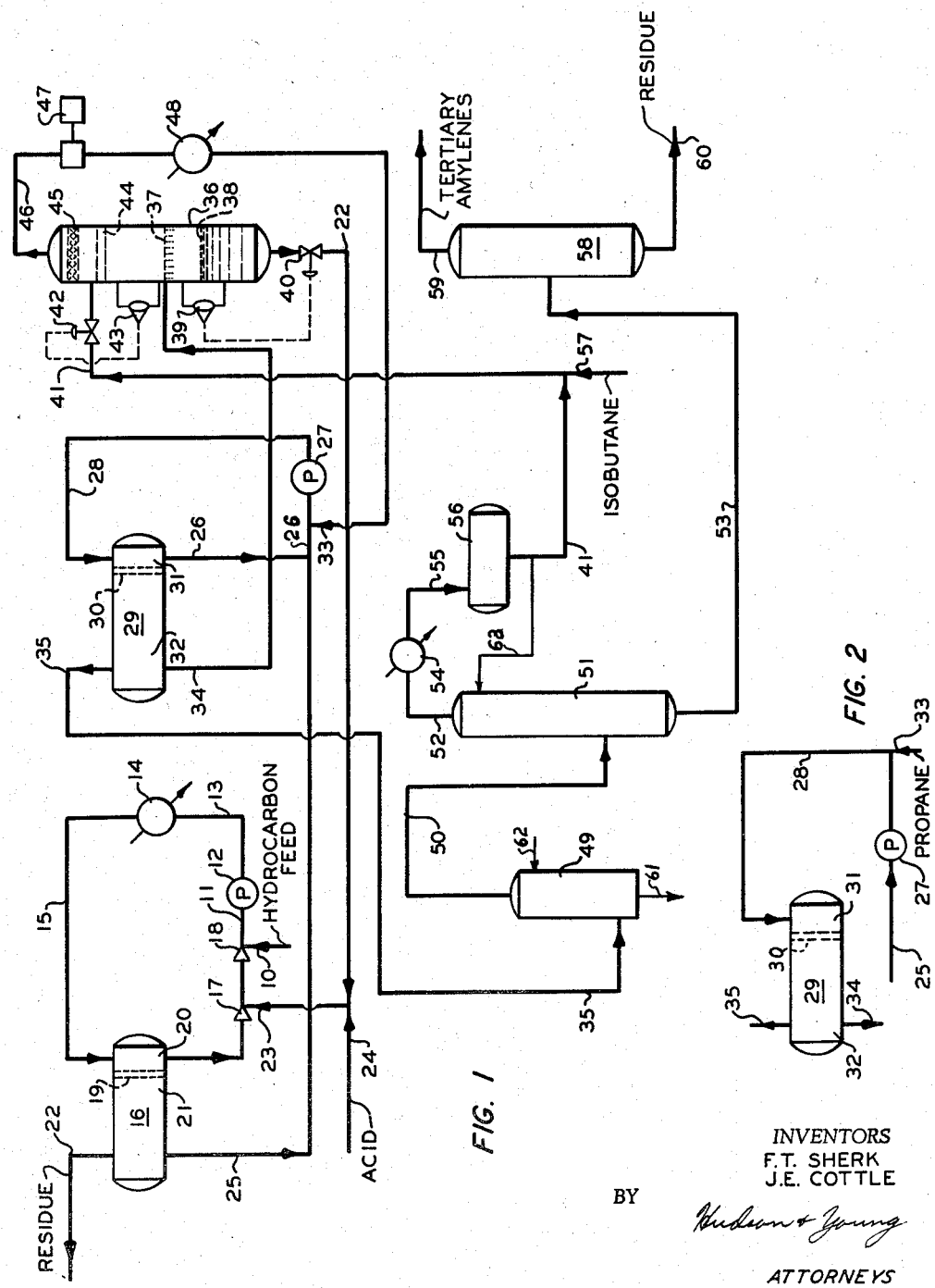

3,185,742
SEPARATION AND RECOVERY OF TERTIARY AMYLENES
Fred T. Sherk and John E. Cottle, Bartlesville, Okla., assignors to Phillips Petroleum Company, a corporation of Delaware
Filed May 26, 1961, Ser. No. 125,611
6 Claims. (Cl. 260—677)

This invention relates to a process of and apparatus for the separation and recovery of tertiary amylenes from mixtures containing tertiary amylenes and other $C_5$ hydrocarbons. In one specific aspect, this invention relates to the separation of tertiary amylenes from hydrocarbon mixtures containing said tertiary amylenes and other $C_5$ hydrocarbons by selectively absorbing said tertiary amylenes in aqueous sulfuric acid and recovering the absorbed tertiary amylenes by stripping the acid phase with a vaporous paraffinic or straight chain olefinic hydrocarbon containing 3 to 4 carbon atoms per molecule.

It is generally known in the art that the $C_5$ tertiary olefins can be removed from hydrocarbon streams containing the same and other $C_5$ hydrocarbons by contacting the stream with sulfuric acid of 50–70 percent by weight concentration and at low temperatures. The tertiary $C_5$ olefins thus selectively extracted into the acid phase can be recovered by dilution of the acid to about 40–45 percent concentration, followed by steam stripping or distillation. When applying this process and other prior art processes to the extraction of tertiary amylenes from $C_5$ hydrocarbon mixtures, it is difficult to recover said tertiary amylenes from the sulfuric acid without undue polymerization of said tertiary amylenes.

It is to be understood that as herein employed the term "tertiary amylenes" refers to 2-methylbutene-1 and 2-methylbutene-2, said amylenes being soluble in the sulfuric acid employed in the acid absorption step of the inventive process.

Accordingly, an object of this invention is to provide an improved method of and apparatus for the separation and recovery of tertiary amylenes from hydrocarbon mixtures containing said tertiary amylenes.

Another object of this invention is to provide an improved process for the separation and recovery of tertiary amylenes from hydrocarbon mixtures containing said tertiary amylenes and other $C_5$ hydrocarbons wherein the polymerization of said tertiary amylenes is reduced to a minimum.

Another object of this invention is to provide an improved process for the hydrocarbon extraction of tertiary amylenes from a sulfuric acid solution of said tertiary amylenes.

Other objects, advantages, and features of our invention will be readily apparent to those skilled in the art from the following description and the appended claims.

Broadly, we have discovered an improved process for extracting tertiary amylenes from a hydrocarbon mixture containing said tertiary amylenes; whereby said hydrocarbon mixture is contacted with an aqueous sulfuric acid and the resulting rich sulfuric acid containing absorbed tertiary amylenes is contacted with a substantially vaporous hydrocarbon having 3 to 4 carbon atoms per molecule, said vaporous hydrocarbon selected from the group consisting of paraffinic hydrocarbons having 3 to 4 carbon atoms per molecule and straight chain olefinic hydrocarbons having 3 to 4 carbon atoms per molecule. Upon contacting the rich sulfuric acid, the vaporous hydrocarbon is condensed with the heat of condensation utilized to raise the temperature of the hydrocarbon-rich acid mixture to the optimum tertiary amylene extraction temperature. The tertiary amylenes are then extracted from the sulfuric acid by the condensed hydrocarbon.

We have further discovered that when the hot separated sulfuric acid is contacted with said vaporous hydrocarbon containing 3 to 4 carbon atoms per molecule that a cooled sulfuric acid and a vaporous hydrocarbon result which can be recycled to the absorption and extraction steps, respectively, thereby providing an efficient continuous tertiary amylene separation and recovery process wherein the heat of the hot sulfuric acid is utilized to vaporize the liquid hydrocarbon separated from the tertiary amylenes.

A more complete understanding of the inventive process can be obtained from the following description and drawings.

FIGURE 1 is a schematic representation of the inventive process.

FIGURE 2 is a schematic representation of another embodiment of the inventive process.

Referring to FIGURE 1, a hydrocarbon feed mixture containing tertiary amylenes and other $C_5$ hydrocarbons is passed to conduit 11 via conduit 10. An aqueous sulfuric acid feed having an acid concentration of 50–70 weight percent is passed to conduit 11 via conduit 23. Within conduit 11 the acid and hydrocarbon feeds are admixed with a continuous circulating hydrocarbon and acid mixture flowing through conduit 11, pumping means 12, conduit 13, heat exchange means 14, conduit 15 and compartment 20 of vessel 16.

Vessel 16 is comprised of compartments 20 and 21. A conventional baffle means 19, such as a perforate plate, separates compartments 20 and 21, thereby restricting the flow of fluid from compartment 20 to compartment 21. A residual hydrocarbon phase is removed from the upper region of vessel 16 via conduit 22. A rich sulfuric acid stream containing absorbed tertiary amylenes is removed from the bottom of vessel 16 via conduit 25.

Mixing within conduit 11 is enhanced by the insertion in said conduit 11 of flow restriction 17 and flow restriction 18. Restriction 17 and restriction 18 consist of a conventional means of effecting a pressure drop within conduit 11, such as an orifice.

The temperature of the continuous circulating hydrocarbon and acid mixture is maintained below 100° F. and preferably the concentration of the aqueous acid circulating phase is maintained in the range of 40–70 volume percent. The average time of contact between the hydrocarbon and acid feds is maintained in the range of 1–15 minutes.

A rich sulfuric acid stream containing absorbed tertiary amylenes is passed from vessel 16 to conduit 26 via conduit 25. A substantially vaporous hydrocarbon feed stream comprising a hydrocarbon selected from the group consisting of normal butane, isobutane, butene-1, cis butene-2, and trans butene-2 is passed to condut 26 via conduit 33. The temperature of the incoming vaporous hydrocarbon stream is maintained in the range of 80–135° F., preferably in the range of 105–115° F. Within conduit 26 the acid and hydrocarbon feeds are admixed with a continuous circulating hydrocarbon and acid mixture flowing through conduit 26, pumping means 27, conduit 28, and compartment 31 of vessel 29.

The extraction of tertiary amylenes from a sulfuric acid solution containing said tertiary amylenes is more favorable at elevated temperatures. However, it is difficult to extract tertiary amylenes at an elevated temperature without causing the polymerization of the tertiary amylenes in the sulfuric acid. Therefore, it is necessary that the rich acid be subjected to as short a heating period as possible before contact is made with the stripping hydrocarbons in order to minimize losses of tertiary amylenes by polymerization. As the vaporous hydrocarbon feed stream is brought into contact with the rich sulfuric acid feed in the continuous circulating stream in conduit 26, the vaporous hydrocarbon is condensed and the heat of condensation transferred to the rich sulfuric acid feed. In this manner, there is a simultaneous heating of the rich sulfuric acid feed and hydrocarbon absorption of the decomposed acid complexes of the tertiary amylenes, eliminating or reducing to a minimum losses of the tertiary amylenes due to polymerization.

Vessel 29 is divided into compartments 31 and 32. The flow of fluid from compartment 31 to compartment 32 is restricted by means of a conventional perforate baffle means 30. A liquid hydrocarbon stream containing the tertiary amylenes is withdrawn from the upper region of compartment 32 via conduit 35. A lean aqueous sulfuric acid stream is withdrawn from the lower region of compartment 32 via conduit 34 and passed to an acid cooling vessel 36. Although not preferred, the direction of the continuously circulating stream can be reversed, resulting in the possible circulation of a fluid mixture with the hydrocarbon phase as the continuous phase due to the fluid mixture being withdrawn from the upper region of compartment 31. By circulating the fluid mixture in the indicated manner, an acid continuous phase is assured. The power requirements necessary to effectively mix the fluid mixture with the acid phase as the continuous phase is less than when the hydrocarbon phase is the continuous phase.

It is also within the scope of this invention to extract the tertiary amylenes from the rich aqueous sulfuric acid by contacting the rich aqueous sulfuric acid with vaporous propane and propylene. Under such conditions, the extraction step as illustrated by FIGURE 2 is preferred due to the high pressure of the vaporous propane and propylene feed. Referring to FIGURE 2, a rich aqueous sulfuric acid stream containing absorbed tertiary amylenes is passed through conduit 25 to a means 27 of raising the pressure of said rich aqueous sulfuric acid stream. The high pressure rich sulfuric acid stream is contacted with a substantially vaporous propane or propylene stream passed to conduit 28 via conduit 33. The hydrocarbon and sulfuric acid mixture is passed via conduit 28 to compartment 31 and from compartment 31 to compartment 32 via baffle means 30. As in the case of FIGURE 1, an extraction temperature in the range of 80–135° F. is maintained by passing vaporous hydrocarbon to conduit 28 at a temperature in the range of 80–135° F. As in the process of FIGURE 1, an extraction temperature of 105–115° F. is preferred. A hydrocarbon stream containing the tertiary amylenes is withdrawn from the upper region of compartment 32 via conduit 35 and a lean aqueous sulfuric acid is withdrawn from the lower region of compartment 32 via conduit 34.

It is within the scope of this invention to provide other means than herein illustrated of absorbing tertiary amylenes from a hydrocarbon mixture containing said tertiary amylenes and other $C_5$ hydrocarbons, and other means than herein illustrated of employing normal butane, isobutane, propane, butene-1, cis butene-2, trans butene-2 and propylene in the extraction of tertiary amylenes from a rich aqueous sulfuric acid solution. Although only single stage absorption and extraction steps are herein illustrated, it is understood that in each case multi-stages can be employed to, in some instances, increase the effectiveness of the absorption and extraction steps.

The hydrocarbon stream containing tertiary amylenes removed from vessel 29 via conduit 35 is passed to caustic scrubber 49. A sulfuric acid-free hydrocarbon stream containing tertiary amylenes is withdrawn from the upper region of caustic scrubber 49 via conduit 50 and passed to a fractionator 51. Caustic solution is passed to caustic scrubber 49 via conduit 62. Sulfuric acid removed from the hydrocarbon stream and spent caustic solution can be intermittently withdrawn from the lower region of caustic scrubber 49 via conduit 61. It is within the scope of this invention to eliminate the caustic washing step.

Fractionator 51 is operated so as to produce an overhead stream consisting of the hydrocarbon used to extract the tertiary amylenes from the rich sulfuric acid, and a tertiary amylene containing kettle stream. The overhead hydrocarbon stream is withdrawn from fractionator 51 via conduit 52, condensed by heat exchange means 54 and passed to an accumulator 56 via conduit 55. A portion of the condensed hydrocarbon stream is returned to fractionator 51 as reflux via conduits 41 and 63. A tertiary amylene containing stream is withdrawn from fractionator 51 via conduit 53 and passed to a distillation column 58.

Distillation column 58 is employed to separate from the tertiary amylenes possible residual heavier hydrocarbon constituents present in the hydrocarbon feed to the absorption step and absorbed by the sulfuric acid in said absorption step. Polymerized tertiary amylenes are also separated from the tertiary amylenes by the distillation step.

A tertiary amylene product stream is withdrawn from the upper region of distillation column 58 via conduit 59 and a hydrocarbon residual stream withdrawn from the lower region of distillation column 58 via conduit 60. With close control of the hydrocarbon feed to the absorption step, it is within the scope of this invention to eliminate the last named distillation step.

Liquid hydrocarbon is removed from accumulator 56 via conduit 41 and passed through control valve 42 to the upper region of cooling vessel 36. The liquid hydrocarbon passed into the upper region of vessel 36 is dispersed by means of contact trays 44, such as dualflow trays, and flows downwardly through cooling vessel 36. A liquid hydrocarbon phase is continuously maintained within cooling vessel 36. The liquid hydrocarbon level is determined by liquid level sensing means 43 which causes valve 42 to open or close in response to said liquid hydrocarbon level within vessel 36. Hot lean aqueous sulfuric acid is withdrawn from vessel 29 and passed via conduit 34 to cooling vessel 36 wherein said lean sulfuric acid is distributed downwardly in vessel 36 by distributing means 37. As the hot lean aqueous sulfuric acid comes in contact with the liquid hydrocarbon, the liquid hydrocarbon is vaporized passing upwardly through cooling vessel 36 in countercurrent contact with the downwardly flowing liquid hydrocarbon. This serves to remove entrained sulfuric acid from the upwardly flowing vaporous hydrocarbon and any traces of sulfuric acid yet remaining in the vaporous hydrocarbon are removed by a mist extraction means 45.

A sulfuric acid phase is maintained within the lower region of vessel 36. A conventional interface sensing means 39 opens or closes valve 40 and thus controls the flow of cool sulfuric acid from cooling vessel 36 in response to the position of the hydrocarbon-acid interface 38. Cool lean sulfuric acid is withdrawn from the bottom of cooling vessel 36 and passed via conduits 22 and 23 to the absorption step. Make-up sulfuric acid can be added to the recycle sulfuric stream via conduit 24.

A vaporized hydrocarbon stream is removed from the upper region of cooling vessel 36 and passed to a means 47 of compressing said vaporous hydrocarbon. The compressed vaporous hydrocarbon is then passed to a heat exchange means 48 wherein the compressed vaporous hydrocarbon is cooled to the extraction temperature. Generally, the cooling effected by heat exchange means 48 is slight. For example, with isobutane as the extracting hydrocarbon, it is only necessary to cool the compressed isobutane approximately 35° F. A vaporous hydrocarbon having a temperature in the range of 80–135° F., preferably, 105–115° F., is then recycled via conduit 33 to the tertiary amylenes extraction step.

A distinct advantage of the inventive process is at once apparent. The heat from the lean aqueous sulfuric acid has been directly transferred to the tertiary amylene extracting hydrocarbon, thereby providing a vaporous hydrocarbon which upon compression has a temperature only slightly above the extraction temperature and a cool lean sulfuric acid at an optimum absorption temperature. Processing costs have been reduced. A substantial increase in efficiency over prior art processes for the separation and recovery of tertiary amylenes has been made.

It is within the scope of this invention to withdraw a liquid hydrocarbon stream from the liquid hydrocarbon phase in vessel 36 and pass said withdrawn liquid hydrocarbon stream as a pump flush to pumping means 27, or to combine said withdrawn stream with the feed to fractionator 51. In this manner, at least a portion of the tertiary amylenes remaining in the sulfuric acid stream passed to vessel 36 via conduit 34 can be extracted from the sulfuric acid in cooling vessel 36 and need not be recycled to the absorption step with the lean sulfuric acid flowing through conduit 22.

Although not herein illustrated, a conventional means of drying the liquid hydrocarbon stream passed from accumulator 56 to cooling vessel 36 can be provided.

The following examples are presented as illustrative of the inventive process.

EXAMPLE I

In order to demonstrate the process step of extracting tertiary amylenes from a rich sulfuric acid, rich sulfuric acid having a composition shown in Table I is passed to conduit 26 via conduit 25 at the rate of 5314 barrels per stream day (b.p.s.d.). The temperature of the rich sulfuric acid is 60° F. Vaporous hydrocarbon having a composition shown in Table I is passed to conduit 26 via conduit 33 at the rate of 4704 b.p.s.d. The temperature of the vaporous hydrocarbon is 115° F. and is compressed to a pressure of 100 p.s.i.a. A hot lean acid at a temperature of 115° F. is withdrawn from compartment 32 at the rate of 4050 b.p.s.d. via conduit 34. The hot lean sulfuric acid is of the composition shown in Table I. A hydrocarbon extract is withdrawn from the upper region of vessel 29 at the rate of 5957 b.p.s.d. via conduit 35. The composition of the hydrocarbon extract is shown in Table I.

Table I

| Composition | Rich sulfuric acid (b.p.s.d.) | Vaporous hydrocarbon (b.p.s.d.) | Lean sulfuric acid (b.p.s.d.) | Hydrocarbon extract (b.p.s.d.) |
|---|---|---|---|---|
| Isobutane | | 4,444 | 4 | 4,440 |
| Butane and butylenes | 2 | 235 | | 237 |
| Isopentane | 5 | 1 | | 6 |
| Pentene-1 | 2 | | | 2 |
| 2 Methylbutene-1 | 146 | 24 | 20 | 150 |
| Pentane | 2 | | | 2 |
| trans Pentene-2 | 5 | | | 5 |
| cis Pentene-2 | 3 | | | 3 |
| 2 methylbutene-2 | 1,307 | | 186 | 1,020 |
| Hexanes | 2 | | | 2 |
| Decenes | | | | 90 |
| 65 wt. percent sulfuric acid | 3,840 | | 3,840 | |

EXAMPLE II

A hot lean sulfuric acid having a composition shown in Table II is passed to the distributing means 37 of vessel 36 via conduit 43 at the rate of 4050 b.p.s.d. The temperature of the hot lean acid is 115° F. Liquid hydrocarbon having a composition shown in Table II is passed to cooling vessel 36 at the rate of 4560 b.p.s.d. The temperature of the liquid hydrocarbon stream is 77° F. A cold lean sulfuric acid having a temperature of 32° F. is withdrawn from the bottom of cooling vessel 36 at the rate of 4052 b.p.s.d. The composition of the cold lean sulfuric acid is as shown in Table II. A vaporous hydrocarbon stream is withdrawn from the top of cooling vessel 36 via conduit 46 at the rate of 4558 b.p.s.d. The vaporous hydrocarbon stream is of a composition shown in Table II and the temperature of the vaporous hydrocarbon stream is 32° F. The vaporous hydrocarbon stream is compressed to a pressure of 100 p.s.i.a. by compression means 47 and the temperature of the compressed hydrocarbon is 150° F. The compressed hydrocarbon is then cooled to a temperature of 115° F. by heat exchange means 48.

Table II

| Composition | Hot lean sulfuric acid (b.p.s.d.) | Liquid hydrocarbon (b.p.s.d.) | Cold lean sulfuric acid (b.p.s.d.) | Vaporous hydrocarbon (b.p.s.d.) |
|---|---|---|---|---|
| Isobutane | 4 | 4,308 | 6 | 4,306 |
| Butane and butylenes | | 228 | | 228 |
| Isopentane | | 1 | | 1 |
| 2 methylbutene-1 | 20 | 23 | 20 | 23 |
| 2 methylbutene-2 | 186 | | 186 | |
| 65 wt. percent sulfuric acid | 3,840 | | 3,840 | |

Although selected vaporous olefinic and paraffinic hydrocarbons having 3 to 4 carbon atoms per molecule can be utilized in the extraction of the tertiary amylenes from the sulfuric acid, it is preferred that the paraffinic hydrocarbons be employed when viewed from the position of the most economical process.

As will be evident to those skilled in the art, various modifications of this invention can be made, or followed, in the light of the foregoing disclosure and discussion without departing from the spirit or scope thereof.

We claim:

1. A process for the separation and recovery of tertiary amylenes from a mixture containing said tertiary amylenes and other $C_5$ hydrocarbons which comprises contacting said mixture with an aqueous sulfuric acid in an absorption zone, maintaining the temperature within said absorption zone below 100° F., said aqueous sulfuric acid having an acid concentration in the range of 50–70 weight percent, passing from said absorption zone a rich sulfuric acid containing said tertiary amylene to an extraction zone, passing a vaporous hydrocarbon selected from the group consisting of paraffinic hydrocarbons and straight chain olefinic hydrocarbons containing 3–4 carbon atoms per molecule to said extraction zone, maintaining the temperature of said vaporous hydrocarbon passed to said extraction zone in the range of 80–135° F., contacting said rich sulfuric acid in said extraction zone with said vaporous hydrocarbon, condensing said vaporous hydrocarbon in said extraction zone, withdrawing from said extraction zone said hydrocarbon as a liquid containing said tertiary amylenes, and withdrawing from said extraction zone the aqueous sulfuric acid.

2. The process of claim 1 wherein said vaporous hydrocarbon is isobutane.

3. A process for the separation and recovery of tertiary amylenes from a mixture containing said tertiary amylenes and other $C_5$ hydrocarbons which comprises contacting said mixture with an aqueous sulfuric acid in an absorption zone, maintaining the temperature within said absorption zone below 100° F., said aqueous sulfuric acid having an acid concentration in the range of 50–70 weight percent, passing a rich sulfuric acid containing said tertiary amylenes from said absorption zone to an extraction zone, passing a vaporous hydrocarbon selected from the group consisting of paraffinic hydrocarbons and straight chain olefinic hydrocarbons containing 3–4 carbon atoms per molecule to said extraction zone, maintaining the temperature of said vaporous hydrocarbon passed to said extraction zone in the range of 80–135° F., contacting said rich sulfuric acid with said vaporous hydrocarbon within said extraction zone, condensing said vaporous hydrocarbon in said extraction zone, passing said hydrocarbon as a liquid containing said tertiary amylenes from said extraction zone to a fractionation zone, passing said hydrocarbon as a vapor from said fractionation zone, condensing said vaporous hydrocarbon stream withdrawn from said fractionation zone, withdrawing liquid tertiary amylenes from said fractionation zone, passing said condensed vaporous hydrocarbon withdrawn from said fractionation zone to a cooling zone, passing lean sulfuric acid from said extraction zone to said cooling zone, contacting said lean sulfuric acid with said condensed vaporous hydrocarbon within said cooling zone, recycling a cooled sulfuric acid from said cooling zone to said absorption zone, and recycling a vaporous hydrocarbon from said cooling zone to said extraction zone.

4. The process of claim 3 wherein said vaporous hydrocarbon is isobutane.

5. The process of claim 1 wherein the temperature of said vaporous hydrocarbon passed to said extraction zone is maintained in the range of 105–115° F.

6. The process of claim 5 to include passing said liquid tertiary amylenes withdrawn from said fractionation zone to a distillation zone, withdrawing from said distillation zone a residual hydrocarbon fraction, and withdrawing from said distillation zone tertiary amylenes.

References Cited by the Examiner
UNITED STATES PATENTS

| | | | |
|---|---|---|---|
| 2,407,386 | 9/46 | Scheeline | 260—677 |
| 2,443,245 | 6/48 | Hibshman | 260—677 |
| 2,445,043 | 7/48 | Souders et al. | 196—132 X |
| 2,560,362 | 7/51 | Morrell et al. | 260—677 |
| 2,881,116 | 4/59 | Siegfried | 202—66 |
| 2,982,722 | 5/61 | Gish | 208—341 |
| 2,992,284 | 7/61 | Sanford et al. | 260—677 |
| 3,113,163 | 12/63 | Edwards et al. | 260—677 |

ALPHONSO D. SULLIVAN, *Primary Examiner.*
MILTON STERMAN, *Examiner.*